United States Patent
Ferguson

(10) Patent No.: US 7,821,450 B1
(45) Date of Patent: Oct. 26, 2010

(54) SYSTEM AND METHOD FOR TRANSMITTING GPS SIGNALS OVER A NETWORK

(75) Inventor: Michael O. Ferguson, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 279 days.

(21) Appl. No.: 12/124,383

(22) Filed: May 21, 2008

(51) Int. Cl.
*G01S 19/39* (2010.01)
*G01S 19/36* (2010.01)

(52) U.S. Cl. ............................. 342/357.22; 342/357.76

(58) Field of Classification Search ............ 342/357.06, 342/357.09, 357.12, 357.13; 701/213, 215
See application file for complete search history.

(56) References Cited

U.S. PATENT DOCUMENTS

| | | | | |
|---|---|---|---|---|
| 5,508,619 A | * | 4/1996 | Ozawa et al. ............... | 324/535 |
| 6,346,911 B1 | * | 2/2002 | King ...................... | 342/357.06 |
| 6,690,323 B1 | * | 2/2004 | Rog et al. ............... | 342/357.12 |
| 2004/0111241 A1 | * | 6/2004 | Nakamitsu et al. .......... | 702/188 |
| 2009/0006699 A1 | * | 1/2009 | Rofougaran ................ | 710/304 |
| 2009/0100495 A1 | * | 4/2009 | Manapragada et al. ...... | 725/138 |

* cited by examiner

*Primary Examiner*—Dao L Phan
(74) *Attorney, Agent, or Firm*—Ryan J. Friedl; Kyle Eppele

(57) ABSTRACT

A method involves digitizing an analog Global Positioning System (GPS) signal received directly from an antenna, storing the digitized analog GPS signal into data buffer storage units, and transmitting the data buffer storage units over a network. The GPS signal received directly from an antenna may be an unprocessed GPS signal. The method may include receiving and queuing the data buffer storage units, converting the digitized analog GPS signal from the data buffer storage units into an analog GPS signal, and transmitting the analog GPS signal to a GPS receiver. The data buffer storage units may be UDP packets and may be multicast over an IP network. The data buffer storage units may be ATM cells and may be transmitted over an ATM network. The analog GPS signal may be converted from electronic to photonic form, or vice versa, prior to storage in the data buffer storage units.

20 Claims, 2 Drawing Sheets

SYSTEM AND METHOD FOR TRANSMITTING GPS SIGNALS OVER A NETWORK

FEDERALLY SPONSORED RESEARCH AND DEVELOPMENT

The System and Method for Transmitting GPS Signals over a Network is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case No. 99083.

CROSS REFERENCE TO RELATED APPLICATIONS

This application is related to U.S. Non-provisional patent application Ser. No. 12/027,159, filed Feb. 6, 2008, entitled "System and Method for GPS Guided Object Key Validation", the content of which is fully incorporated by reference herein.

BACKGROUND

In certain environments, such as on a ship, received analog Global Positioning System (GPS) signals are transmitted to receivers via dedicated cabling. While effective, for systems wherein the antenna resides in a distant location from the receiver or where the GPS signal is to be transmitted to multiple receivers, extensive cabling is required. For such systems where the GPS signal is to be transmitted to multiple receivers, the GPS signal is split and amplified multiple times. Because the GPS signal is already weak prior to being split, splitting the GPS signal causes undesirable signal degradation and potentially a loss of signal. Therefore, there is a need for a system and method for securely and reliably transmitting accurate GPS signals to one or more receivers while minimizing signal loss.

DETAILED DESCRIPTION OF SOME EMBODIMENTS

Figure 1:
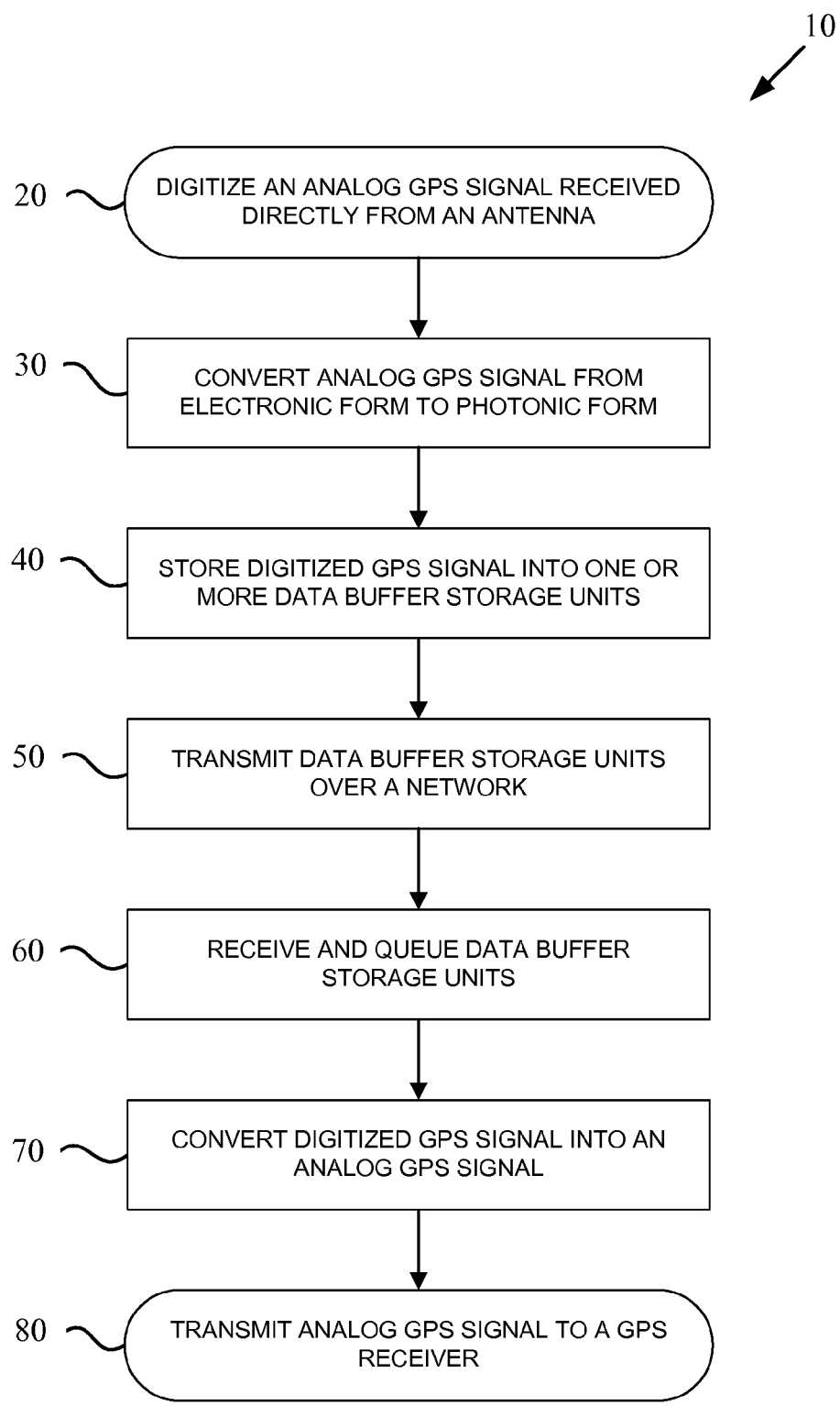
FIG. 1 shows a flowchart of a method in accordance with one embodiment of the System and Method for Transmitting GPS Signals over a Network.
Figure 2:
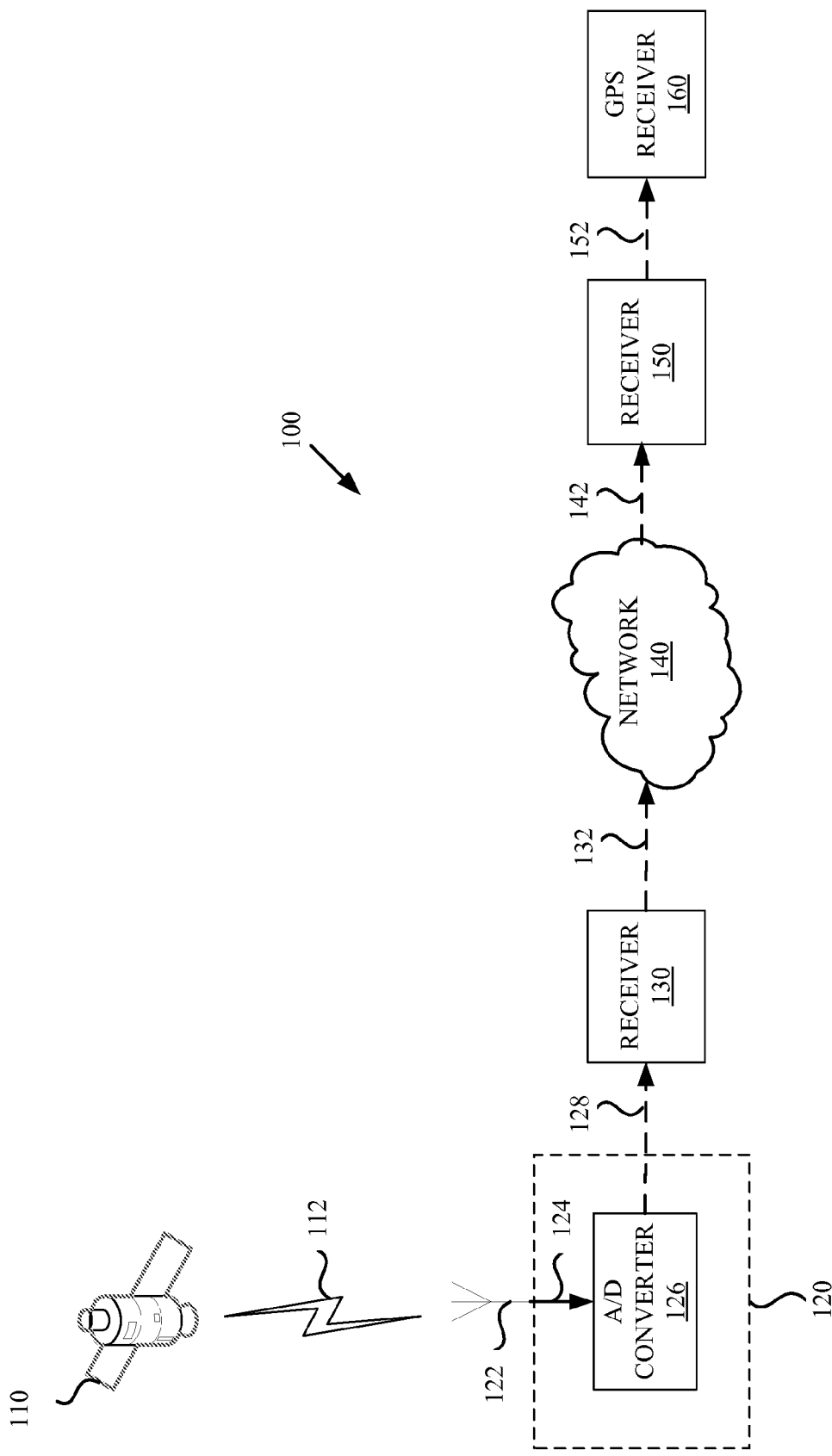
FIG. 2 shows a diagram illustrating the operation of a system in accordance with one embodiment of the System and Method for Transmitting GPS Signals over a Network.

FIG. 1 shows a flowchart of a method 10 in accordance with one embodiment of the System and Method for Transmitting GPS Signals over a Network. For illustrative purposes, method 10 will be discussed with reference to system 100 as shown in FIG. 2 and described herein.

Method 10 may begin at step 20, which involves digitizing an analog GPS signal received directly from an antenna. In some embodiments, the analog GPS signal (shown as signal 112 in FIG. 2) may be transmitted by a GPS satellite 110 and received by an antenna 122 connected to a receiver 120. The analog GPS signal contains GPS data stored therein. The GPS data may include data about several satellites that are in view, including the satellite pseudorandom number (PRN), the encrypted P(Y)-code navigation message, and accurate GPS timing data. The analog GPS signal 112 may have a frequency range between, for example, about 500 MHz and about 1600 MHz.

Antenna 122 may transmit the received analog GPS signal 124 directly to a digitization device such as an analog-to-digital (A/D) converter 126. As used herein, the term "directly" means that the analog GPS signal is transmitted from the antenna to the device without intervention. An example of intervention may be from a signal processing device. In such embodiments, the analog GPS signal received directly from the antenna is an unprocessed analog GPS signal. An unprocessed analog GPS signal may be defined as a GPS signal that does not undergo any signal processing, such as filtering, amplification, combination with other signals, or processing that may enhance the representations of the signal's physical or electrical phenomena, subsequent to being received by an antenna and prior to being received by a digitization device such as an A/D converter.

In some embodiments, the analog GPS signal may be converted from electronic form to photonic form subsequent to being received by the antenna and prior to being received by a digitization device such as A/D converter 126. Such conversion may be performed by conversion processes stored within hardware contained within receiver 120. Processes to convert an analog signal from electronic form to photonic form are known in the art and are not described herein. Converter 126 may digitize the received analog GPS signal 124. Such digitization processes are known to one having ordinary skill in the art and are not further described herein.

In embodiments wherein the analog GPS signal is not converted from electronic form to photonic form subsequent to being received by the antenna and prior to being received by a digitization device, method 10 proceed to step 30. Step 30 involves converting the analog GPS signal from electronic form to photonic form subsequent to being digitized and prior to being stored into data buffer storage units. Such conversion may be performed by conversion processes stored within hardware contained within receiver 130. Such processes to convert an analog signal from electronic form to photonic form are known in the art and are not described herein.

Method 10 may then proceed to step 40. Step 40 involves storing the digitized analog GPS signal into one or more data buffer storage units. A data buffer storage unit may be defined as a computer unit used for temporary storage of data before transmission of the data to another destination. As an example, a data buffer storage unit may be a User Datagram Protocol (UDP) packet or an Asynchronous Transfer Mode (ATM) cell. In some embodiments, the data buffer storage units may be stored in a software program. In some embodiments, the data buffer storage units may be stored in volatile storage. In some embodiments, the data buffer storage units may be stored in non-volatile storage, such as RAM, SDRAM, ROM, PROM, EPROM, EEPROM, DDR, and DRAM. Step 40 may be performed by a receiver 130. Receiver 130 may receive the digitized signal 128 from receiver 120. Digitized signal 128 may be transmitted from receiver 120 to receiver 130 via a wired or wireless connection. As a result of step 40, the data buffer storage units will contain a digitized version of the analog GPS signal (not shown) having GPS data therein.

Following step 40, method 10 may proceed to step 50. Step 50 involves transmitting the data buffer storage units over a network. As shown in FIG. 2, receiver 130 transmits, via a wired or wireless connection, a signal 132 to network 140. Signal 132 contains the data buffer storage units having a digitized version of the analog GPS signal received directly from an antenna stored therein. In some embodiments, the data buffer storage units are UDP packets and step 50 involves transmitting the UDP data packets over a network, such as an Internet Protocol (IP) network. In some embodiments, the data buffer storage units may be multicast over an IP network. In other embodiments, the data buffer storage units are ATM cells and step 50 involves transmitting the ATM cells over a network, such as an ATM network.

Method 10 may then proceed to step 60, which involves receiving and queuing data buffer storage units. As shown in FIG. 2, receiver 150 receives a signal 142 from network 140. Signal 142 contains the data buffer storage units. As an example, in some embodiments the data buffer storage units that are received and queued may be the data buffer storage units transmitted in step 50. In other embodiments, step 60 involves receiving and queuing other data buffer storage units. In some embodiments, step 60 involves receiving and queuing ATM cells. In some embodiments, step 50 involves receiving and queuing UDP packets. Receiver 150 may be used to queue the data buffer storage units. As an example, the data buffer storage units may be queued according to the order of arrival of sampled GPS analog data that has been digitized.

In some embodiments wherein the digitized analog GPS signal has been converted from electronic form to photonic form prior to storage of the GPS signal into the data buffer storage units, the received GPS signal may be converted from photonic form back into electronic form prior to step 70. In other embodiments, method 100 may proceed directly to step 70.

Step 70 involves converting the digitized version of the analog GPS signal from the received and queued data buffer storage units back into an analog GPS signal. Such a conversion may be performed by receiver 150, which may contain a digital-to-analog (D/A) converter therein. Such D/A conversion processes are known to one having ordinary skill in the art and are not described herein. As an example, in embodiments where the received data buffer storage units are UDP data packets, step 70 involves converting the digitized version of the analog GPS signal from the received and queued UDP data packets into an analog GPS signal. As a further example, in embodiments where the received data buffer storage units are ATM cells, step 70 involves converting the digitized version of the analog GPS signal from the received and queued ATM cells into an analog GPS signal.

Method 10 may then proceed to step 80. Step 80 involves transmitting the analog GPS signal to a GPS receiver. As shown in FIG. 2, receiver 150 transmits analog GPS signal 152 to GPS receiver 160. In some embodiments, GPS receiver 160 may be coupled to or contained within an object. As an example, GPS receiver 160 may be coupled to or contained within a vehicle or projectile.

In some embodiments, method 10 may be divided into separate methods that may each be performed independent of one another. As an example, steps 20, 30, 40, and 50 may be separated from steps 60, 70, and 80 and may be separately performed as a transmission method. As a further example, steps 60, 70, and 80 may be separated from steps 20, 30, 40, and 50 and may be separately performed as a receiving method.

Method 10 may be stored on a computer readable storage medium, wherein method 10 is represented by computer readable programming code. Method 10 may be implemented using a programmable device, such as a computer-based system. Method 10 may be implemented using various programming languages, such as "C", "C++", "FORTRAN", Pascal", and "VHDL".

Various computer-readable storage mediums, such as magnetic computer disks, optical disks, electronic memories and the like, may be prepared that may contain instructions that direct a device, such as a computer-based system, to implement the steps of method 10. Once an appropriate device has access to the instructions contained on the computer-readable storage medium, the storage medium may provide the information and programs to the device, enabling the device to perform method 10.

As an example, if a computer disk containing appropriate materials, such as a source file, an object file, or an executable file were provided to a computer, the computer would receive the information, appropriately configure itself, and perform the steps of method 10. The computer would receive various portions of information from the disk relating to different steps of method 10, implement the individual steps, and coordinate the functions of the individual steps.

Many modifications and variations of the System and Method for Transmitting GPS Signals over a Network are possible in light of the above description. Within the scope of the appended claims, the System and Method for Transmitting GPS Signals over a Network may be practiced otherwise than as specifically described. Further, the scope of the claims is not limited to the implementations and embodiments disclosed herein, but extends to other implementations and embodiments as may be contemplated by those having ordinary skill in the art.

I claim:

1. A method comprising the steps of:
   digitizing an unprocessed analog Global Positioning System (GPS) signal as received directly from an antenna;
   storing the digitized unprocessed analog GPS signal into one or more data buffer storage units; and
   transmitting the data buffer storage units over a network.

2. The method of claim 1 further comprising the steps of:
   receiving and queuing the data buffer storage units; and
   converting the digitized unprocessed analog GPS signal from the received and queued data buffer storage units into an analog GPS signal.

3. The method of claim 2 further comprising the step of transmitting the analog GPS signal to a GPS receiver.

4. The method of claim 1, wherein the digitized unprocessed analog GPS signal is converted from electronic to photonic form prior to the step of storing the digitized unprocessed analog GPS signal into one or more data buffer storage units.

5. The method of claim 1, wherein the unprocessed analog GPS signal has a frequency range between about 500 MHz and about 1600 MHz.

6. The method of claim 1, wherein the data buffer storage units are User Datagram Protocol (UDP) data packets and the step of transmitting the data buffer storage units over a network comprises transmitting the UDP data packets over a an Internet Protocol (IP) network.

7. The method of claim 6, further comprising the steps of:
   receiving and queuing the UDP data packets; and
   converting the data buffer storage units from the received and queued UDP data packets into an analog GPS signal.

8. The method of claim 1, wherein the data buffer storage units are Asynchronous Transfer Mode (ATM) cells and the step of transmitting the data buffer storage units over a network comprises transmitting the ATM cells over an ATM network.

9. The method of claim 8, further comprising the steps of:
   receiving and queuing the ATM cells; and
   converting the data buffer storage units from the received and queued ATM cells into an analog GPS signal.

10. The method of claim 1, wherein the step of transmitting the data buffer storage units over a network comprises multicasting the data buffer storage units over an IP network.

11. A computer readable storage medium having a method encoded thereon, the method represented by computer readable programming code, the method comprising the steps of:
digitizing an analog GPS signal received directly from an antenna;
storing the digitized analog GPS signal into one or more data buffer storage units; and
transmitting the data buffer storage units over a network.

12. The computer readable storage medium of claim 11, wherein the data buffer storage units are UDP data packets and the step of transmitting the data buffer storage units over a network comprises multicasting the UDP data packets over an IP network.

13. The computer readable storage medium of claim 11, wherein the data buffer storage units are ATM cells and the step of transmitting the data buffer storage units over a network comprises transmitting the ATM cells over an ATM network.

14. The computer readable storage medium of claim 11, wherein the analog GPS signal received directly from an antenna is converted from electronic to photonic form prior to the step of storing the digitized analog GPS signal into one or more data buffer storage units.

15. The computer readable storage medium of claim 14, wherein the analog GPS signal received directly from an antenna is an unprocessed analog GPS signal.

16. The computer readable storage medium of claim 11, wherein the analog GPS signal received directly from an antenna is an unprocessed analog GPS signal.

17. A computer readable storage medium having a method encoded thereon, the method represented by computer readable programming code, the method comprising the steps of:
receiving and queuing one or more data buffer storage units, the data buffer storage units having a digitized unprocessed analog GPS signal received directly from an antenna stored therein; and
converting the digitized unprocessed analog GPS signal from the received and queued data buffer storage units into an analog GPS signal.

18. The computer readable storage medium of claim 17 further comprising the step of transmitting the analog GPS signal to a GPS receiver.

19. The computer readable storage medium of claim 17, wherein the data buffer storage units comprise UDP packets and the step of receiving and queuing the one or more data buffer storage units includes the step of receiving the UDP packets from an IP network.

20. The computer readable storage medium of claim 17, wherein the data buffer storage units comprise ATM cells and the step of receiving and queuing the data buffer storage units includes the step of receiving the ATM cells from an ATM network.

* * * * *